United States Patent [19]

Jürs

[11] Patent Number: 4,835,817
[45] Date of Patent: Jun. 6, 1989

[54] APPARATUS FOR SKINNING DOUBLE FILLETS OF FISH HAVING A HIGHLY SENSITIVE SKIN

[75] Inventor: Michael Jürs, Lübeck, Fed. Rep. of Germany

[73] Assignee: Nordischer Maschinenbau Rud. Baader GmbH + CO KG, Lubeck, Fed. Rep. of Germany

[21] Appl. No.: 239,437

[22] Filed: Sep. 1, 1988

[30] Foreign Application Priority Data

Sep. 10, 1987 [EP] European Pat. Off. ........ 87113219.7

[51] Int. Cl.$^4$ .............................................. A22C 25/17
[52] U.S. Cl. .......................................... 17/62; 17/21; 99/589
[58] Field of Search ................................ 17/62, 24, 21; 193/35 F; 99/588, 589

[56] References Cited

U.S. PATENT DOCUMENTS

| 3,324,915 | 6/1967 | Townsend | 17/21 |
| 3,613,154 | 10/1971 | Townsend | 17/21 |
| 4,222,152 | 9/1980 | Braeger | 17/62 |
| 4,340,995 | 7/1982 | Braeger | 17/62 |
| 4,378,613 | 4/1983 | Crouch | 17/21 |

Primary Examiner—Willis Little
Attorney, Agent, or Firm—Thomas R. Morrison

[57] ABSTRACT

In an apparatus for skinning double fillets of fish having highly sensitive skin, e.g. by a cooking treatment, such as herb-seasoned fillets, and comprising an entraining roller provided with narrow grooves along its surface lines, a skinning knife directly facing its circumferential surface with its cutting edge and a presser surface arranged below the same, the entraining roller is provided in its central area with a radial groove, in which is incorporated an auxiliary conveyor with elastic vanes radially projecting approximately up to the diameter of the entraining roller, while above the radial groove is fitted a hold-down device resiliently displaceable by the double fillet.

20 Claims, 1 Drawing Sheet

APPARATUS FOR SKINNING DOUBLE FILLETS OF FISH HAVING A HIGHLY SENSITIVE SKIN

BACKGROUND OF THE INVENTION

1. Field of the Invention

The invention relates to an apparatus for skinning double fillets of fish having a highly sensitive skin, for example, due to cooking, e.g. herb-seasoned fillets, the apparatus comprising a fillet-conveying driving or entraining roller driven in rotary manner and having a gripping circumferential surface, a resiliently displaceable skinning knife facing the entraining roller at an adjustable spacing, and a presser surface extending below the skinning knife.

2. Prior Art

A skinning apparatus provided for the aforementioned skinning purposes is disclosed in German Pat. No. 30 21 151. In this apparatus, the entraining roller, which is termed skinning roller, is provided with grooves extending along the axially extending surface lines of the cylindrical roller, which grooves are interrupted by a groove region surrounding the circumference of the entraining roller and having a pitch of grooves which is larger than that of the remaining regions of the circumferential surface. The function of this apparatus is not satisfactory because faults made evident by, in particular, recurrent, persistent blockages occur comparatively often. The reason for this is the inadequate capacity of the larger pitch groove zones, so that the dorsal fin strip coming to rest in this area is engaged and the gristly fin holders run against the cutting edge of the skinning knife, which, apart from the fact that the skinning knife may cut into the fin holders which may then remain in the final product, will mainly lead to skin patches remaining on the skinned fillets.

3. Objects of the Invention

The main object of the invention is to obviate these shortcomings. In particular, it is an object of the present invention to improve a skinning apparatus for double fillets of the type set out above with regard to its function such that the products obtained are satisfactory to the consumers concerned.

According to the invention, these objects are achieved in an apparatus comprising an entraining roller driven to rotate and defining a gripping surface for engaging the fillets to be processed, a resiliently displaceable skinning knife having a cutting edge and facing the entraining roller at a settable spacing, and a presser surface extending below the skinning knife in that the entraining roller has at least one radial groove with an auxiliary conveyer arranged therein, the auxiliary conveyor being provided with elastic vanes projecting approximately up to the external diameter of the entraining roller, and that a resilient hold-down device is positioned over the radial groove and upstream of the cutting edge of the skinning knife, when seen in the processing or conveying direction of the fillets. The advantages of these features are in particular that, as a result of their elasticity, the vanes can, if necessary, be displaced by the dorsal fin strip and, as a result of their resilience, will have a cleaning effect on the cutting edge of the skinning knife in this area.

In order to achieve a particularly efficient hold-down action of the hold-down device, this may be, at least in its portion facing the radial groove and cooperating therewith, roughly of the same width as the radial groove.

Advantageously, the radial groove receiving the auxiliary conveyor in the case of a single-path construction of the apparatus should be located in the centre of the entraining roller, whereas in the case of a two-path construction it should be located in the outer quarter points of the length dimension of the entraining roller. The radial groove can, advantageously, be designed to have a width of between 5 and 12 millimeters, preferably of 8 millimeters.

A safety-controllable apparatus which can be integrated into an automatic fish processing line expediently may be obtained if, upstream of the entraining roller, there is provided a belt conveyor rotating in the same direction as and at a lower circumferential speed than the entraining roller. It is advantageous for manual feeding purposes if the belt conveyor has line-up marks directed towards the radial grooves of the entraining roller.

BRIEF DESCRIPTION OF THE DRAWINGS

Other and further objects of the present invention will be apparent from the following description and claims and are illustrated in the accompanying drawings, which by way of illustration schematically show a preferred embodiment of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DETAILED DESCRIPTION OF THE PREFERRED EMBODIMENT

Figure 1:
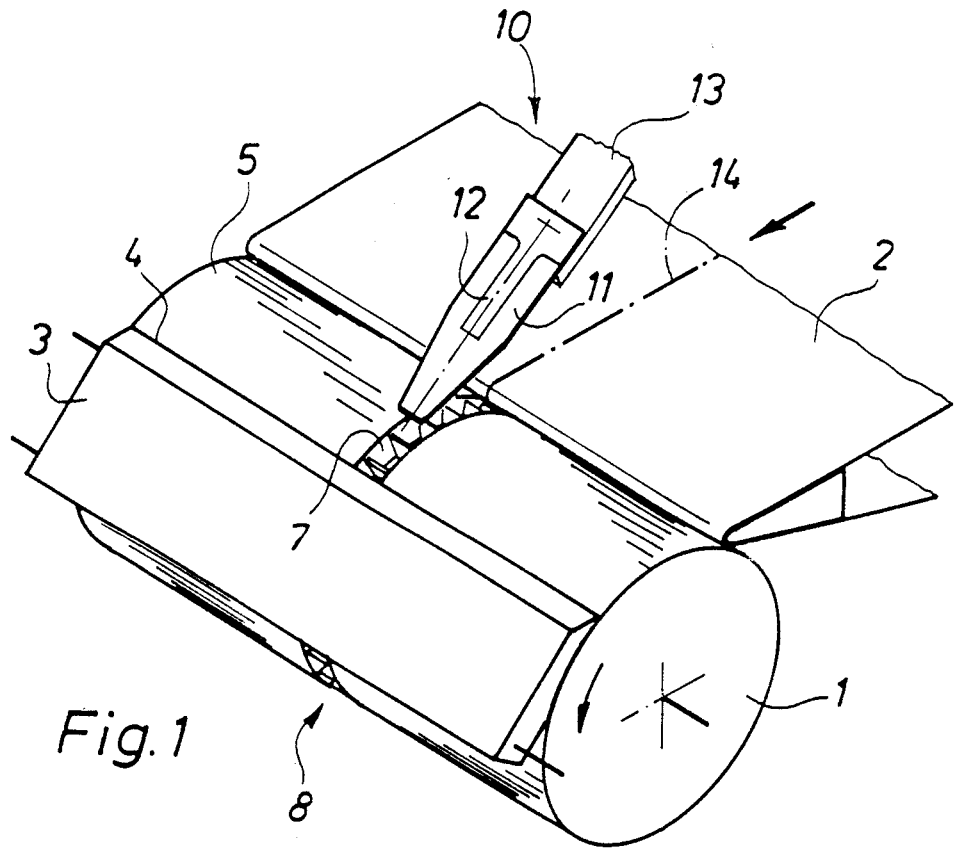
FIG. 1 shows a detail view of the skinning apparatus in an axonometric, simplified representation.
Figure 2:
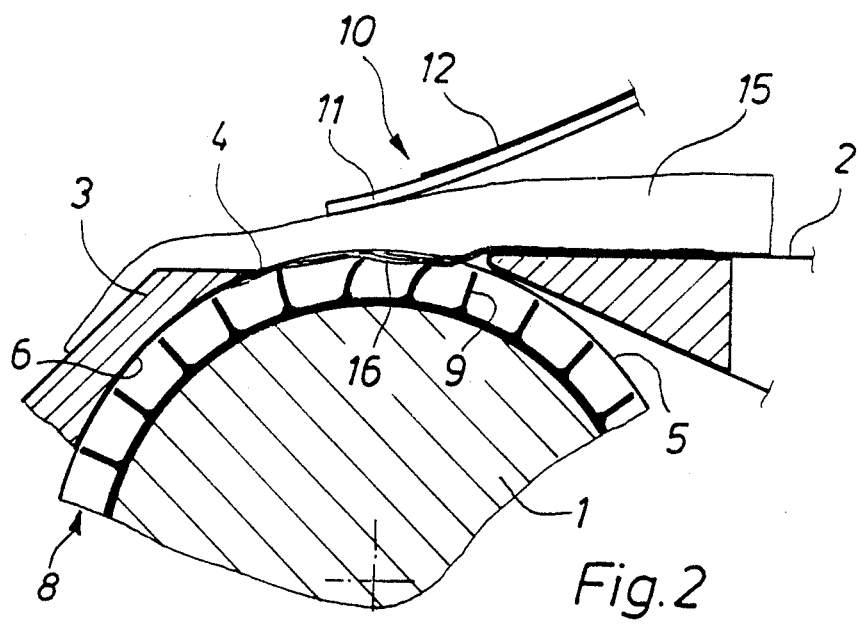
FIG. 2 shows a cross-section through the skinning apparatus in the region of the auxiliary conveyor according to the invention.

In a not shown skinning machine frame is mounted in known manner an entraining roller 1, which is driven to revolve in an appropriate way. Upstream thereof is provided a supply or feed belt 2 made from a flexible material, which serves as a conveying support for the double fillets to be processed and feeds same approximately tangentially to the entraining roller 1. With the latter is associated on the discharge side thereof a skinning knife 3, which defines a cutting edge 4 parallel to the axis of the entraining roller 1 and is located in the immediate vicinity of the circumferential surface 5 of roller 1. Immediately below the cutting edge 4 there is provided a concave presser surface 6, whose radius of curvature substantially corresponds to that of the circumferential surface 5 of the entraining roller 1. The skinning knife 3 and the presser surface 6 can be moved away resiliently from the circumferential surface 5 of the entraining roller 1 against slight spring tension. The cutting edge 4 of the skinning knife 3 can have an inner bevel or chamfer of a few tenths of a millimetre. The circumferential surface 5 is provided with grooves having a fine pitch, i.e. being arranged at narrow distances of e.g. 1.7 mm from each other, and extending along its surface lines. They are interrupted by a radial groove 7 located in the centre of the length of the entraining roller 1 and can have a substantially square cross-section of approximately 8×8 mm. An auxiliary conveyor 8 having the shape of an entrainer ring, e.g. made from an elastomer, is mounted in the radial groove 7, so as to rotate together with the entraining roller 1, and is provided with elastic vanes 9 projecting radially from the bottom of the radial groove 7 and having a spacing or pitch roughly corresponding to the depth of radial groove 7. The outer edge of the vanes 9 is located on a diameter, which at a maximum is that of the entraining roller 1. Above the latter and over the radial slot 7 there is arranged a hold-down device 10, at least whose portion facing the roller 1 having roughly the same width as the latter. This hold-down device 10 can, for example, be formed by a rubber tongue 11, which is supported on its top surface by a spring leaf 11 and is fixed to an adjustable, resiliently held-down swivel arm 13. The feed belt 2 carries on its surface line-up marks 14 represented, in the present case, by a dash-dotted line and being aligned with the radial groove 7 in the feeding direction of the fillets.

The apparatus operates in the following way:

A double fillet 15 to be skinned is placed on the feed belt 2 with the skin downwards and preferably with the tail end first in such a way that its dorsal fin strip 16 comes to rest on the line-up mark 14. As a result of the conveying movement of feed belt 2, the double fillet 15 reaches the entraining roller 1 and its dorsal fin strip 16 meets its circumferntial surface 5 in the vicinity of the radial groove 7. In this area the vanes 9 of tha auxiliary conveyor 8 support the double fillet 15, whilst the hold-down device 10 positioned above the same ensures an incorporation or intrusion of the dorsal fin into the radial groove 7, if necessary accompanied by the displacement of the vanes 9. Thus, the leading end of the double fillet 15 with its skin and the dorsal fin strip 16 passes reliably below the cutting edges 4 of the skinning knife 3. The thus initiated skinning process continues into the areas of the circumferential surface 5 carrying the flank parts of the double fillet 15, conveying taking place by the skin pressing against the well-gripping circumferential surface 5 of the entraining roller 1 by means of the presser surface 6.

What is claimed is:

1. An apparatus for processing, by skinning, double fillets of fish having a highly sensitive skin, for example, due to cooking, such as herb-seasoned fillets, said apparatus comprising
   (a) entraining roller means driven in a rotary manner and defining a circumferential surface designed to cause a non-skid engagement with said double fillets to convey them in a conveying direction;
   (b) skinning knife means opposing said circumferential surface at a settable distance, being resiliently displaceable with regard to said entraining roller and defining a cutting edge extending transversely to said conveying direction;
   (c) a presser surface extending below said skinning knife means and facing said circumferencial surface;
   (d) at least one radial groove of defined depth and width provided in said entraining roller means to extend around said circumferential surface;
   (e) auxiliary conveying means arranged in said at least one radial groove and comprising a plurality of elastic vanes distributed over the circumferential extension of said at least one groove, each vane projecting from the bottom of said groove approximately up to said entraining roller means external diameter defined by said circumferential surface; and
   (f) resilient hold-down means arranged above said at least one radial groove and upstream of said cutting edge.

2. An apparatus as claimed in claim 1, wherein said hold-down means in its portion opposing said at least one groove has a width corresponding substantially to said width of said at least one groove.

3. An apparatus as claimed in claim 1, wherein said radial groove is positioned in the centre of said entraining roller means when seen in the longitudinal extension thereof.

4. An apparatus as claimed in claim 2, wherein said radial groove is positioned in the centre of said entraining roller means when seen in the longitudinal extension thereof.

5. An apparatus as claimed in claim 1, wherein oone radial groove each is located in the outer quarter points of the longitudinal dimension of said entraining roller means.

6. An apparatus as claimed in claim 2, wherein one radial groove each is located in the outer quarter points of the longitudinal dimension of said entraining roller means.

7. An apparatus as claimed in claim 3, wherein said at least one groove has a width of between 5 and 12 millimeters.

8. An apparatus as claimed in claim 4, wherein said at least one groove has a width of between 5 and 12 millimeters.

9. An apparatus as claimed in claim 5, wherein each of said grooves has a width of between 5 and 12 millimeters.

10. An apparatus as claimed in claim 6, wherein each of said grooves has a width of between 5 and 12 millimeters.

11. An apparatus as claimed in claim 3, wherein said at least one groove has a width of 8 millimeters.

12. An apparatus as claimed in claim 4, wherein said at least one groove has a width of 8 millimeters.

13. An apparatus as claimed in claim 5, wherein each of said grooves has a width of 8 millimeters.

14. An apparatus as claimed in claim 6, wherein each of said grooves has a width of 8 millimeters.

15. An apparatus as claimed in claim 1, wherein belt conveyor means are arranged upstream of said entraining roller means when seen in said conveying direction, which belt conveyor means revolve in the same direction as and at a lower circumferential speed than said entraining roller means.

16. An apparatus as claimed in claim 2, wherein belt conveyor means are arranged upstream of said entraining roller means when seen in said conveying direction, which belt conveyor means revolve in the same direction as and at a lower circumferential speed than said entraining roller means.

17. An apparatus as claimed in claim 3, wherein belt conveyor means are arranged upstream of said entraining roller means when seen in said conveying direction, which belt conveyor means revolve in the same direction as and at a lower circumferential speed than said entraining roller means.

18. An apparatus as claimed in claim 5, wherein belt conveyor means are arranged upstream of said entraining roller means when seen in said conveying direction, which belt conveyor means revolve in the same direction as and at a lower circumferential speed than said entraining roller means.

19. An apparatus as claimed in claim 15, wherein said belt conveyor means have at least one line-up mark directed towards said at least one radial groove of said entraining roller means, respectively.

20. An apparatus as claimed in claim 18, wherein said belt conveyor means have a plurality of line-up marks, one each of which is directed towards one of said radial grooves of said entraining roller means.

* * * * *